US011081743B2

(12) United States Patent
Chen et al.

(10) Patent No.: US 11,081,743 B2
(45) Date of Patent: Aug. 3, 2021

(54) BATTERY MODULE WITH HEAT DISSIPATING ENCAPSULANT MATERIAL AND METHODS THEREFOR

(71) Applicant: A123 Systems LLC, Waltham, MA (US)

(72) Inventors: Yang Chen, Windsor (CA); Jonathan Hostler, Canton, MI (US); Dylan Propst, Plymouth, MI (US)

(73) Assignee: A123 SYSTEMS LLC, Waltham, MA (US)

( * ) Notice: Subject to any disclaimer, the term of this patent is extended or adjusted under 35 U.S.C. 154(b) by 100 days.

(21) Appl. No.: 16/090,135

(22) PCT Filed: Mar. 31, 2017

(86) PCT No.: PCT/US2017/025616
§ 371 (c)(1),
(2) Date: Sep. 28, 2018

(87) PCT Pub. No.: WO2017/173412
PCT Pub. Date: Oct. 5, 2017

(65) Prior Publication Data
US 2019/0115638 A1      Apr. 18, 2019

Related U.S. Application Data

(60) Provisional application No. 62/317,370, filed on Apr. 1, 2016.

(51) Int. Cl.
*H01M 10/647*      (2014.01)
*H01M 10/653*      (2014.01)
(Continued)

(52) U.S. Cl.
CPC ..... *H01M 10/647* (2015.04); *H01M 10/0525* (2013.01); *H01M 10/613* (2015.04);
(Continued)

(58) Field of Classification Search
None
See application file for complete search history.

(56) References Cited

U.S. PATENT DOCUMENTS

2005/0026014 A1\* 2/2005 Fogaing ............... H01M 2/00
                                                         429/437
2005/0089750 A1   4/2005 Ng et al.
(Continued)

FOREIGN PATENT DOCUMENTS

EP      0547661 A1    6/1993
EP      2353200 B1    6/2014
(Continued)

OTHER PUBLICATIONS

Japanese Patent Office, Office Action Issued in Application No. 2018-551165, dated Feb. 16, 2021, 8 pages.
(Continued)

*Primary Examiner* — Carmen V Lyles-Irving
(74) *Attorney, Agent, or Firm* — McCoy Russell LLP

(57) ABSTRACT

Disclosed herein, is a battery module that comprises an encapsulant material exhibiting improved thermal transfer and heat dissipation characteristics. In one example embodiment, the battery module comprises a "stack" of cells, wherein at least some of the cells, and optionally each cell, is not separated by a metal plate or tab-shaped heat sink layer, and instead, the cells are substantially surrounded by an encapsulant material and stacked directly upon one another.

10 Claims, 16 Drawing Sheets

(51) Int. Cl.

| | | |
|---|---|---|
| *H01M 10/613* | (2014.01) | |
| *H01M 50/20* | (2021.01) | |
| *H01M 50/103* | (2021.01) | |
| *H01M 10/6551* | (2014.01) | |
| *H01M 10/0525* | (2010.01) | |
| *H01M 10/42* | (2006.01) | |

(52) U.S. Cl.
CPC ..... *H01M 10/653* (2015.04); *H01M 10/6551* (2015.04); *H01M 50/103* (2021.01); *H01M 50/20* (2021.01); *H01M 10/425* (2013.01)

(56) References Cited

U.S. PATENT DOCUMENTS

| | | |
|---|---|---|
| 2008/0090137 A1 | 4/2008 | Buck et al. |
| 2010/0104927 A1 | 4/2010 | Albright |
| 2010/0112429 A1 | 5/2010 | Murata |
| 2010/0304203 A1 | 12/2010 | Buck et al. |
| 2014/0023906 A1* | 1/2014 | Hashimoto ......... H01M 2/1094 429/120 |
| 2014/0377623 A1 | 12/2014 | Pyzza et al. |

FOREIGN PATENT DOCUMENTS

| | | |
|---|---|---|
| JP | 2004146161 A | 5/2004 |
| JP | 2005019134 A | 1/2005 |
| JP | 2005518642 A | 6/2005 |
| JP | 2007500920 A | 1/2007 |
| JP | 2008192380 A | 8/2008 |
| JP | 2009277354 A | 11/2009 |
| JP | 2012174972 A | 9/2012 |
| JP | 2012221572 A | 11/2012 |
| JP | 2013145649 A | 7/2013 |
| JP | 2013222603 A | 10/2013 |
| KR | 20140077811 A | 6/2014 |
| KR | 20150025236 A | 3/2015 |
| WO | 2013047430 A1 † | 4/2013 |

OTHER PUBLICATIONS

ISA Korean Intellectual Property Office, International Search Report Issued in Application No. PCT/US2017/025616, dated Jul. 11, 2017, WIPO, 3 pages.

European Patent Office, Extended European Search Report Issued in Application No. 17776878.5, dated Sep. 23, 2019, Germany, 12 pages.

\* cited by examiner
† cited by third party

BATTERY MODULE WITH HEAT DISSIPATING ENCAPSULANT MATERIAL AND METHODS THEREFOR

CROSS-REFERENCE TO RELATED APPLICATION

The present application is a United States National Phase Application of International Patent Application Serial No. PCT/US2017/025616, entitled "BATTERY MODULE WITH HEAT DISSIPATING ENCAPSULANT MATERIAL AND METHODS THEREFOR," filed on Mar. 31, 2017. International Patent Application Serial No. PCT/US2017/025616 claims priority to U.S. Provisional Application Ser. No. 62/317,370, entitled "BATTERY MODULE WITH HEAT DISSIPATING ENCAPSULANT MATERIAL AND METHODS THEREFOR", filed Apr. 1, 2016, The entire contents of each of the above-mentioned applications are hereby incorporated by reference in entirety for all purposes.

FIELD

This application relates generally to battery modules and methods for making battery modules.

BACKGROUND AND SUMMARY

Lithium-ion (Li-ion) batteries are a type of secondary (rechargeable) battery which produce energy resultant from electrochemical reactions. A lithium-ion battery may include a battery cell having a positive electrode, a negative electrode, an ionic electrolyte solution that facilitates the movement of ions back and forth between the two electrodes, and a porous separator membrane which allows for ion movement between the electrodes and further ensures that the two electrodes do not make contact with each other.

Battery performance may be affected by temperature, and thus some battery modules may include various heat sinks to dissipate heat. For example, in a module including a plurality of cells stacked together, metal tabs may be placed between each cell and may have ends that contact an outer housing to transfer heat to the housing and thus to the environment of the housing. For example, heat sink materials may be placed between prismatic cells such that the cells do not directly contact each other.

The inventors herein have recognized issues with the above-described configuration, in that it may complex processes and/or designs may be needed to ensure that the metal tabs separating the cells each sufficiently draw heat from the cells. Further, it can be equally complicated to ensure that each tab sufficiently contacts the housing so that a heat transfer conductive path is provided from each tab to the housing in order to transfer sufficient heat away from the module. These traditional heat sink designs may comprise an L-shaped configuration wherein the heat sink components make surface-to-surface contact with both the prismatic cells and the outer sheath or housing of the module and unless intimate contact between the L-shaped heat sink and the module housing are ensured, temperature effects may cause loss of battery performance.

As one example, the above drawbacks may be addressed by providing a battery module utilizing a thermally conductive encapsulant material to better dissipate heat from within the module, and thus, may enable reduction and/or elimination of heat sink devices between the cells.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 1-11, 12A, 12B, and 13-14 are drawn to scale, although other relative dimensions may be used.

DETAILED DESCRIPTION

Figure 1B:
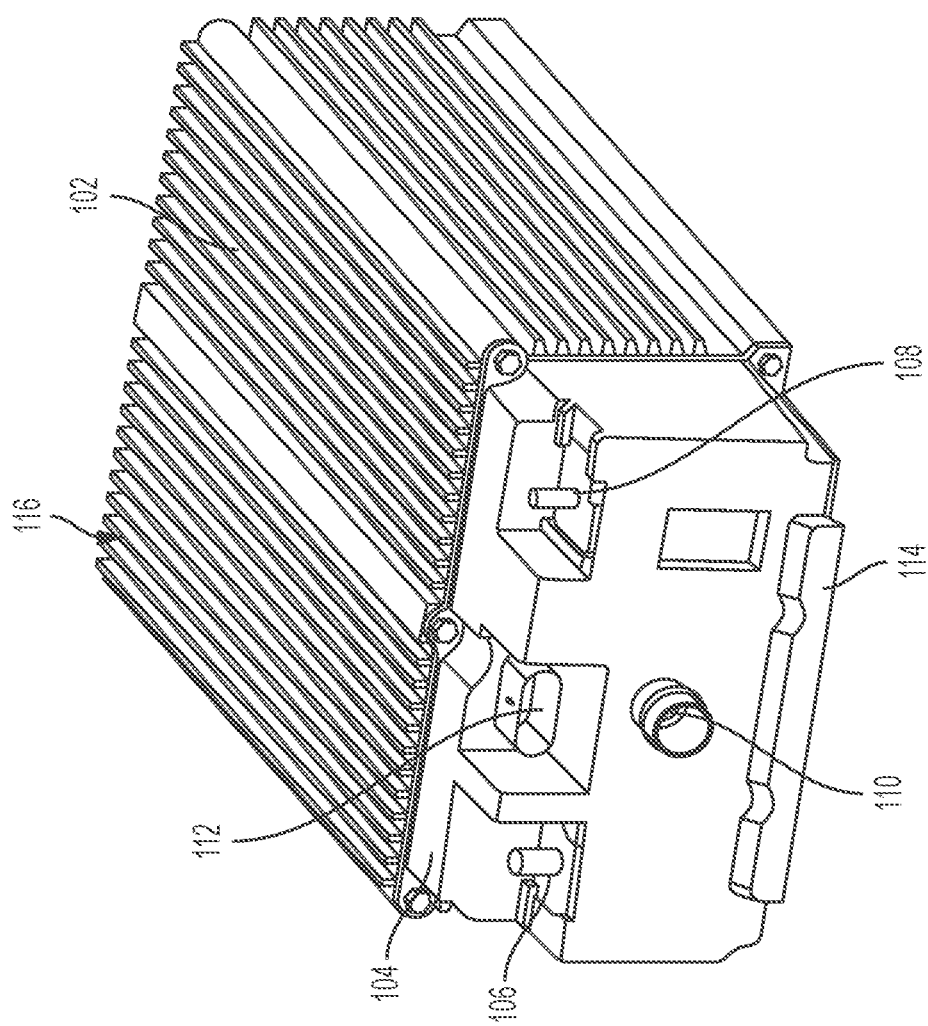
FIG. 1B shows an isometric side view of an example battery module embodiment.

The present disclosure will now be described in further detail herein with reference to the accompanying figures, in which exemplary embodiments of the invention are illustrated. The particular embodiment is merely exemplary in nature and is in no way intended to limit the scope of the invention, its application, or uses, which may vary. The embodiments disclosed herein are described with relation to the non-limiting definitions and terminology included herein. These definitions and terminology are not intended to function as a limitation on the scope or practice of the invention, but are presented solely for illustrative and descriptive purposes. While the processes and/or compositions may be described as an order of individual steps or using specific materials, it will be appreciated that steps or materials may be interchangeable such that the description of the disclosure herein may include multiple parts or steps arranged in many different ways.

Components, process steps, and other elements that may be substantially the same in one or more embodiments are identified coordinately and are described with minimal repetition. It will be noted however, that elements identified coordinately may also differ to some degree.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" refers to "and/or". As used herein, the term "and/or" includes any and all combinations of one or more of the associated listed items. It will be further understood that the terms "comprises" and/or "comprising," or "includes" and/ or "including" when used in this specification, specify the presence of stated features, regions, integers, steps, operations, elements, and/or other components, but do not preclude the presence or addition of one or more other features, regions, integers, steps, operations, elements, components, and/or groups thereof. The term "a combination thereof" or "a mixture of" means a combination including at least one of the foregoing elements.

Unless otherwise defined, all terms (including technical and scientific terms) used herein have the same meaning as commonly understood by one of at least ordinary skill in the art to which the disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly defined herein.

The present disclosure provides a high charge capacity and high discharge capacity battery module comprising a series of stacked electrode sheet type battery cells. In one embodiment, the battery module or a plurality of battery modules may be installed inside a larger battery pack containing at least one battery module. Such battery pack assemblies may then be installed in terrain, marine, aeronautic vehicles, or other such vehicles that may require a battery capable of high charge and discharge which may further comprise a variety of high power electric loads. For example, components such as computer-controlled power inverters or electronic motors used for vehicle propulsion or some other form of mechanical actuation may require a substantial power capability of the battery pack and therefore, the battery modules therein.

A plurality of battery modules may further be used by an electric utility company for example, to help equalize a local power distribution network's worst-case supply fluctuation events. In the present example, the modules may be installed inside a "battery station," which may comprise a large, rigid, stationary, and weather-proof extrusion or enclosure that may be secured to a foundation of some kind. The modules may be mounted and electrically connected via racks with docks such that any module may be rapidly connected or disconnected when necessary. For example, when a battery station may require service, the station may be opened, and one or more battery modules may be removed or replaced such that the entire station may not require movement.

Battery packs and battery stations may include secondary subassemblies and other components installed therein such as electronic sensor modules, electronic control modules, electrical charging modules, electrical interface connectors, electrical fuses, electrical wiring harnesses, and/or thermal management elements such as heat sinks in order to deliver complete end-item battery packs to vehicle manufacturers or complete end-item battery stations to electric utility companies as noted briefly above.

Disclosed herein, is a battery module that comprises an encapsulant material that exhibits improved thermal transfer and heat dissipation characteristics. In one example embodiment, the battery module further comprises a "stack" of cells, wherein each cell is not separated by a heat sink material layer, such as a flat plate-like metal tab. For example, in stacked prismatic cells within a battery module, each separate cell element may be separated by a heat sink material which must make sufficient contact with both the cells and the extrusion or housing element. In this way, the overall size of the disclosed battery module may be reduced, and the potential complications resulting from the placement of the heat sink materials may be avoided or reduced. For example, in some methods of producing a battery module comprising a plurality of stacked prismatic cells, an L-shaped heat sink plate or tab may be inserted between each stacked cell such that the heat sink material makes substantial contact with the cells and with the outer extrusion housing. In some instances, the placement of said heat sink materials may be altered or shifted within the battery module upon construction or during a finishing step for example.

The use of an encapsulant material that provides improved thermal transfer between mediums may therefore eliminate or reduce the problems faced by those constructing similar prismatic cell modules.

For clarification purposes, the term "prismatic" refers to the physical shape of the battery cell that is to be used with this disclosure and it differentiates this module from other modules which may comprise cylindrical cells. A prismatic cell has two large flat surfaces that are positioned parallel to one another. The cell shape may further be used as a method of mechanical retention and thermal management within the module housing. The cell's electrical terminals typically protrude from any of the other four smaller surfaces which are positioned perpendicular to the main two surfaces.

Figure 1A:
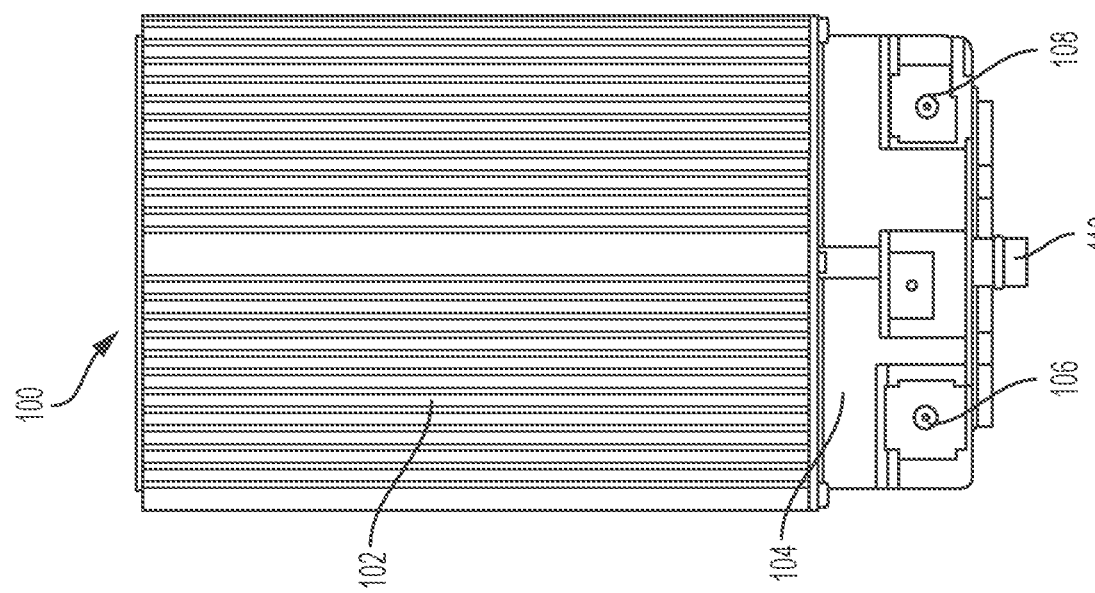
FIG. 1A shows a plan view of an example embodiment of a battery module.

Turning now to FIG. 1A this figure illustrates a lithium-ion battery module according to the present disclosure. The battery module 100 may comprise an extrusion 102 also referred to herein as a housing, or enclosure. The extrusion 102 in at least one embodiment may comprise an Aluminum construction and may further include a plurality of heat dissipating protrusions 116 that may be disposed along an exterior surface of the extrusion 102 along a top face and each of a right and left side face. The protrusions 116 may be formed integrally with the extrusion 102 in at least one embodiment. In this way, the heat generated within the battery module may be transferred to the exterior extrusion 102 and the protrusions 116, being in contact with the external atmosphere, may direct heat away from and out of the battery module.

Further, the battery module 100 may comprise a front cover panel 104 which may substantially seal the module and protect the cells stacked within. In at least one embodiment, cell terminals 106, 108 may be disposed on a top, exterior surface of the front cover panel 104. In this way, the battery module may be connected directly to loads, or may be connected to other battery modules within a larger battery pack for example. Additionally, a front exterior vent port 110 may be disposed along a front exterior surface of the front cover panel 104. The vent port 110 may be provided to serve multiple functions. For example, the provided vent port 110 may serve as a vent providing ventilation to protect against potential condensation build-up within the interior of the battery module and within a battery pack comprising said battery module. Additionally, the vent port 110 may be configured to function as an exit port for potential gases resultant from an overcharge event condition. In this way, the safety of the battery module and the safety of a battery pack comprising one or more battery modules may be improved.

With respect to FIG. 1B, the figure provides an isometric view of the battery module 100 provided in FIG. 1A. In this view, it is possible to visualize an additional component which may further aid in the placement and/or connection of the battery module in such suitable applications. The front cover panel 104 may, in some embodiments, further include a lower positioning element 114 which may be provided to allow for sufficient connection between the battery module and other elements such as the interior of a larger battery pack or within a battery station.

Figure 2B:
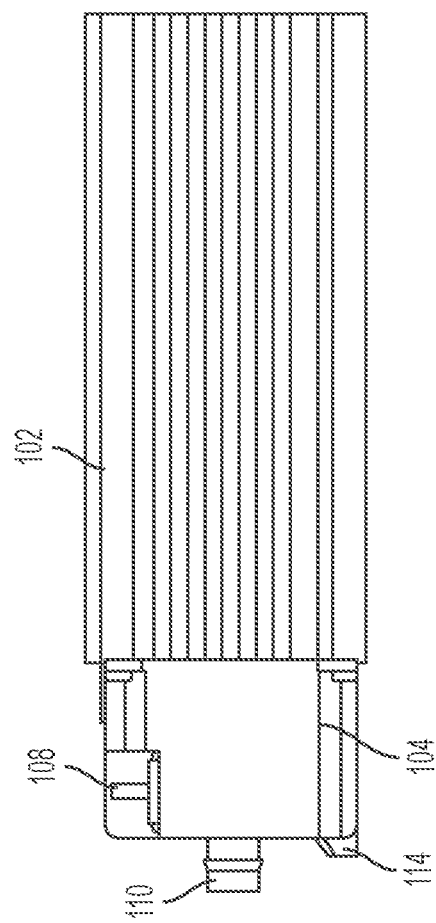
FIG. 2B shows a side profile view of an example battery module embodiment.
Figure 2A:
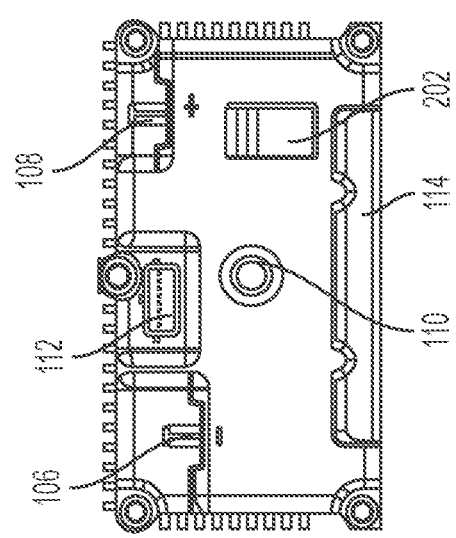
FIG. 2A shows a front view of an example battery module embodiment.

In FIG. 2A, a front profile view of a battery module embodiment is provided. In this view, it may be seen that the battery terminals 106, 108 are disposed along the front surface of the front cover panel 104 in a staggered pattern. In this way, the connections of each terminal may be secluded or isolated such that connection between the two terminals may not be provided. In doing this, the chances of potentially short-circuiting the battery module may be reduced. Additionally, a positioning recess or groove 202 may be disposed along a front exterior surface of the front cover panel 104. In some embodiments, the positioning groove 202 may provide additional coupling capabilities to the battery module. For example, in some battery packs or battery stations, there may comprise a protrusion on the interior surface. The protrusion of the present example may match the shape of the provided groove 202 such that the battery module may be held securely in the battery pack or station. Additionally, the positioning groove 202 may comprise a shape other than the provided rectangular shape such that the groove 202 may match a protrusion or other such positioning element in a way that substantially secures the battery module.

FIG. 2B shows a side profile view of the battery module embodiment provided in FIG. 2B. In this view, it is possible to see that the terminal(s) 106, 108 are positioned such that they may not rise above a top surface of the front cover panel 104. Additionally, the front cover panel 104 may comprise one or more positioning or fastening elements such as vent port 110 and positioning element 114. As noted above, such positioning or fastening elements may be provided to allow for additional mounting capabilities and/or to vary the applicability of the battery module across a wide variety of uses.

Figure 3:
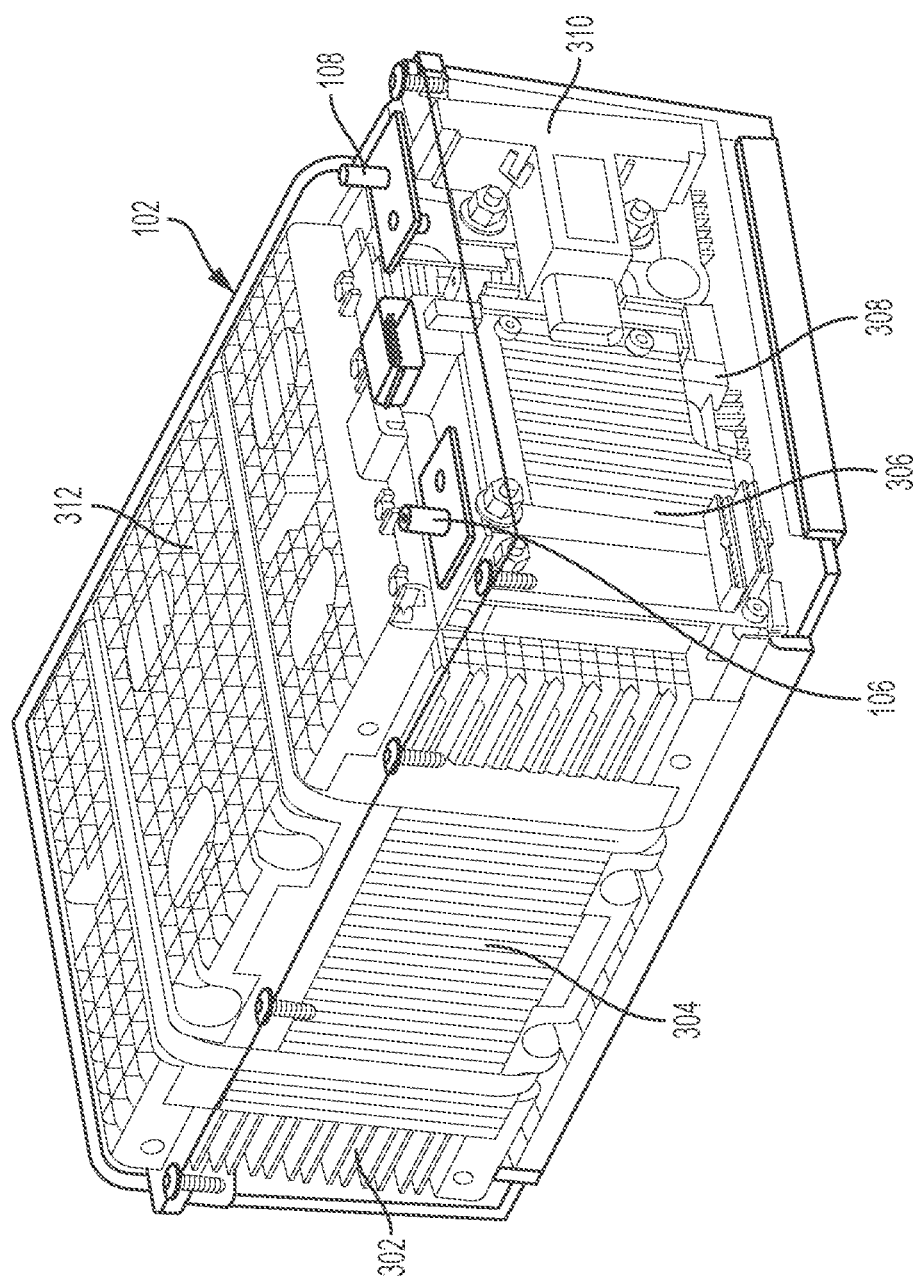
FIG. 3 shows an isometric side view of an example battery module embodiment with a transparent housing.

Turning now to FIG. 3, a fully constructed battery module according to the present disclosure is provided wherein the module's extrusion 102 is transparent. In this way, the various internal components of the battery module 300 may be more clearly visible. In at least one embodiment, the battery module may comprise a stack of lithium-ion cells 302 further comprising a plurality of individual cells, an end plate 304 on either side which may retain the cell stack securely within the module's extrusion 102. Additionally, the module may comprise an electronics board 306, a fuse 308, a relay assembly 310, and one or more isolation components 312 disposed within an interior section of the module's extrusion 102 which defines the module's housing. In at least one embodiment, the relay 310 may comprise a 48V relay, although other voltages are contemplated herein. While lithium-ion cells are disclosed, other cell chemistries may be used, if desired, such as nickel metal hydride.

The provided cell stack 302 may be positioned within an interior of the cell's extrusion 102 and may further be retained in a safe position via the inclusion of endplates 304. An endplate 304 may be disposed along each of the two most longitudinal sides of the cell stacks. Further, each cell within a cell stack may be in direct face-sharing contact with one another in at least one example embodiment. In this way, the additional thickness resultant from the inclusion of heat sink materials which may typically be disposed between each cell may be reduced. In doing so however, there may be an increased demand for heat dissipation from within the cell. Therefore, the encapsulant material disclosed below may provide thermal transfer capabilities to the cell even without the inclusion of a heat sink layer between each cell.

Figure 4:
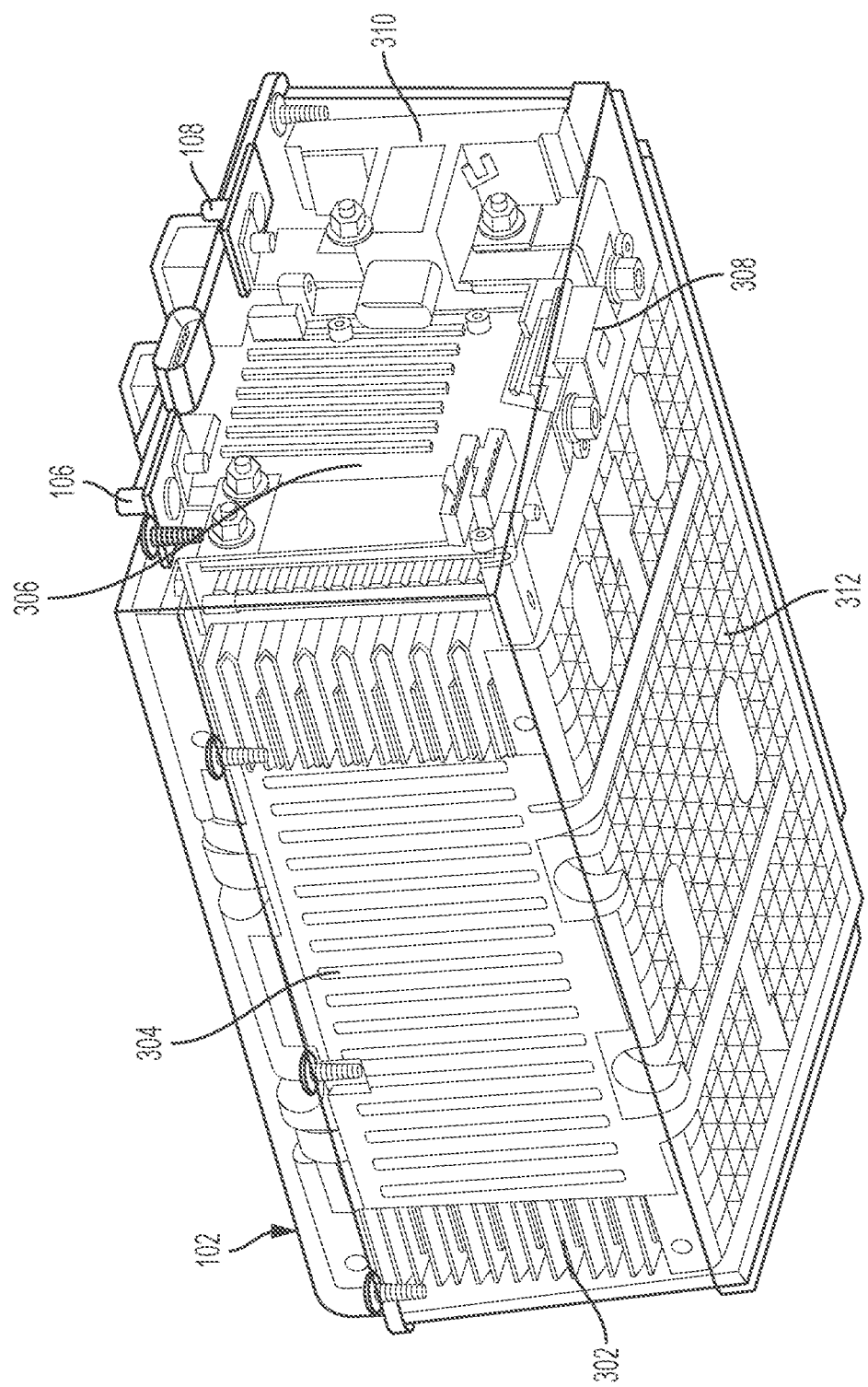
FIG. 4 shows an isometric upward view of an example battery module embodiment with a transparent housing.

FIG. 4 provides an isometric side view of an embodiment of a battery module. Similarly to FIG. 3, a fully constructed battery module according to the present disclosure is provided wherein the module's extrusion 102 is transparent. In this way, the various internal components of the battery module 300 may be more clearly visible. In at least one embodiment, the battery module may comprise a stack of cells 302 further comprising a plurality of individual cells, an end plate 304 on either side which may retain the cell stack securely within the module's extrusion 102. Additionally, the module may comprise an electronics board 306, a fuse 308, a relay assembly 310, and one or more isolation components 312 disposed within an interior section of the module's extrusion 102 which defines the module's housing.

The provided cell stack 302 may be positioned within an interior of the cell's extrusion 102 and may further be retained in a safe position via the inclusion of endplates 304. An endplate 304 may be disposed along each of the two most longitudinal sides of the cell stacks. Further, each cell within a cell stack may be in direct face-sharing contact with one another in at least one example embodiment. In this way, the additional thickness resultant from the inclusion of heat sink materials which may typically be disposed between each cell may be reduced. In doing so however, there may be an increased demand for heat dissipation from within the cell. For this reason, an encapsulant material having excellent thermal transfer characteristics may be useful in such a battery module application.

Figure 5:
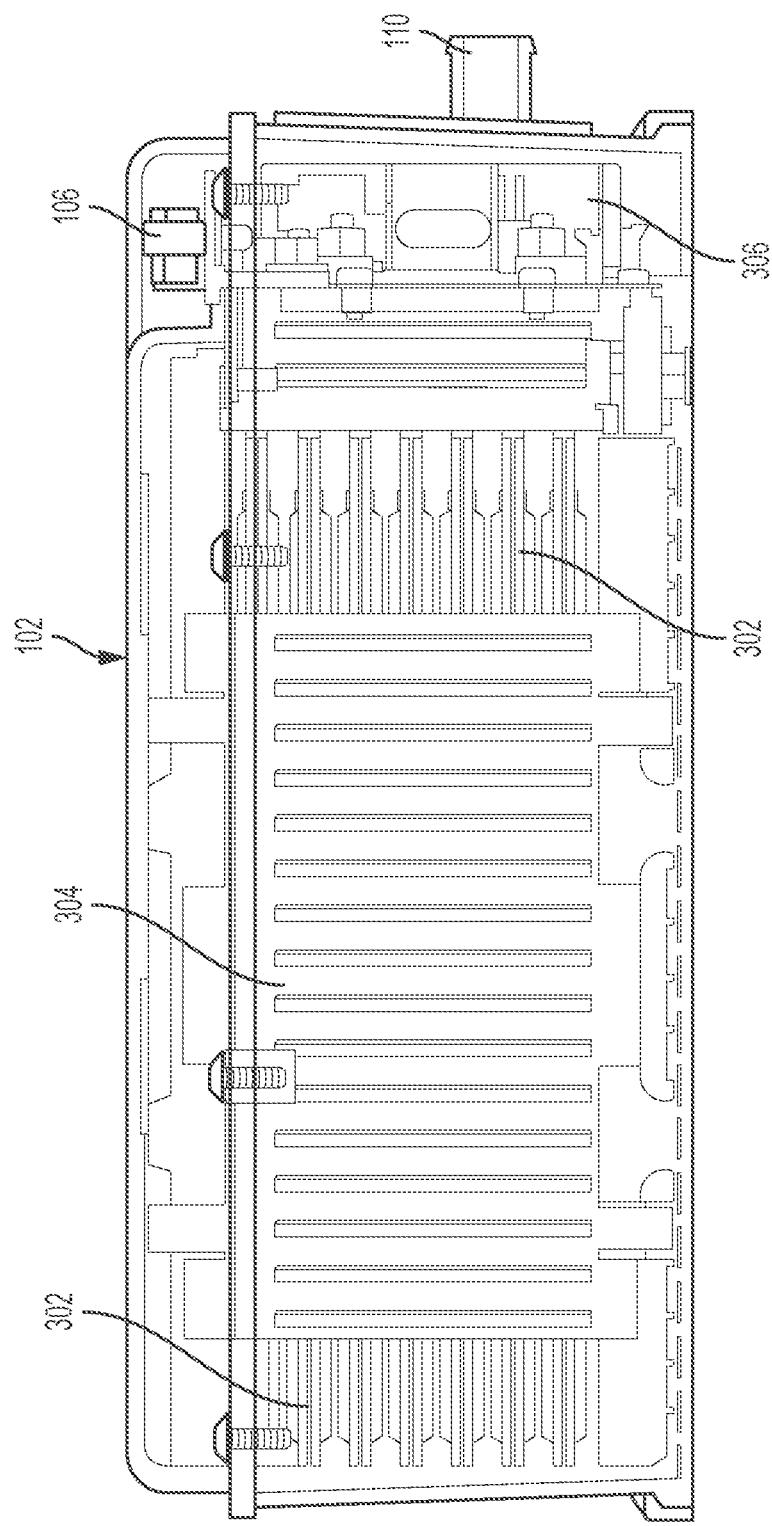
FIG. 5 shows a side profile of one embodiment of a battery module with a transparent housing.

The illustration provided in FIG. 5 shows a side view of one embodiment of a battery module according to the present disclosure. Similarly to FIGS. 3 and 4, a fully constructed battery module according to the present disclosure is provided wherein the module's extrusion 102 is transparent. In this way, the various internal components of the battery module 300 may be more clearly visible. In at least one embodiment, the battery module may comprise a stack of cells 302 further comprising a plurality of individual cells, an end plate 304 on either side which may retain the cell stack securely within the module's extrusion 102. Additionally, the module may comprise an electronics board 306, a fuse 308, a relay assembly 310, and one or more isolation components 312 disposed within an interior section of the module's extrusion 102 which defines the module's housing.

The provided cell stack 302 may be positioned within an interior of the cell's extrusion 102 and may further be retained in a safe position via the inclusion of endplates 304. An endplate 304 may be disposed along each of the two most longitudinal sides of the cell stacks. Further, each cell within a cell stack may be in direct face-sharing contact with one another in at least one example embodiment. In this way, the additional thickness resultant from the inclusion of heat sink materials which may typically be disposed between each cell may be reduced. In doing so however, there may be an increased demand for heat dissipation from within the cell. For this reason, an encapsulant material having excellent thermal transfer characteristics may be useful in such a battery module application.

Figure 6:
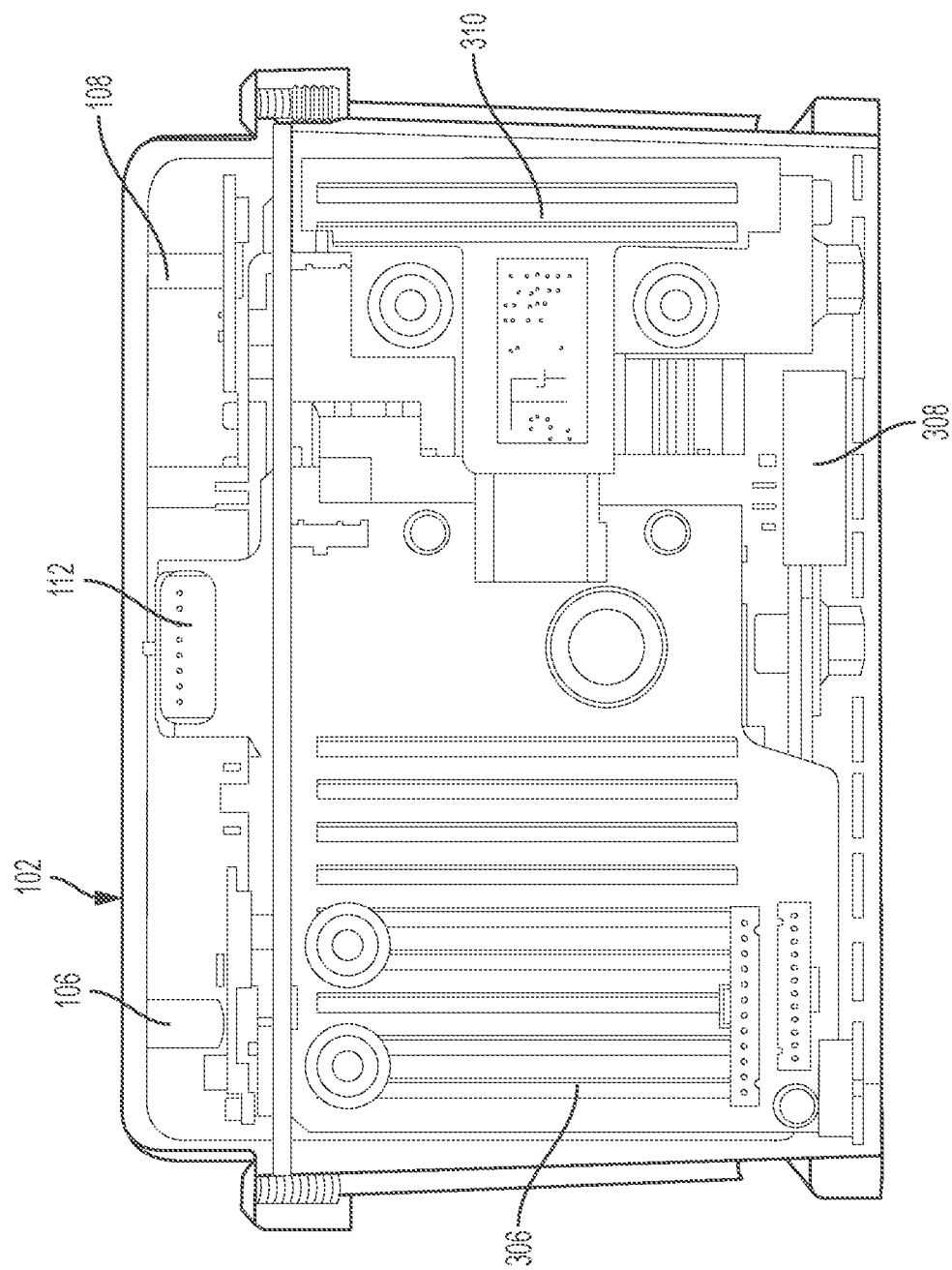
FIG. 6 shows a front view of one embodiment of a battery module with a transparent housing.

A front view of an example battery module embodiment is provided in FIG. 6. Again, the module's housing or extrusion 102 is provided in a transparent manner to aid in the visualization of the interior components of the module. In this view additional exterior components disposed along a front surface of the battery module are visible. The module may comprise an electronics board 306, at least one fuse 308, a relay 310 which may comprise a 48V relay or another voltage relay, two battery terminals 106, 108, and an electrical connection member 112.

In some embodiments, the electrical connection member 112 may be provided to allow for connections between the battery module and a load and/or connections between one or more additional battery modules such as in the case of a battery pack for example. In still other examples, the electrical connection member 112 may function as a vehicle communication channel for the battery. Additionally, the connection member 112 may provide an electrical communication in order to provide power to the relay of the battery module. In this way, the applicability of the battery module and therefore, also a battery pack comprising one or more battery modules according to the present disclosure may be expanded.

Figure 7:
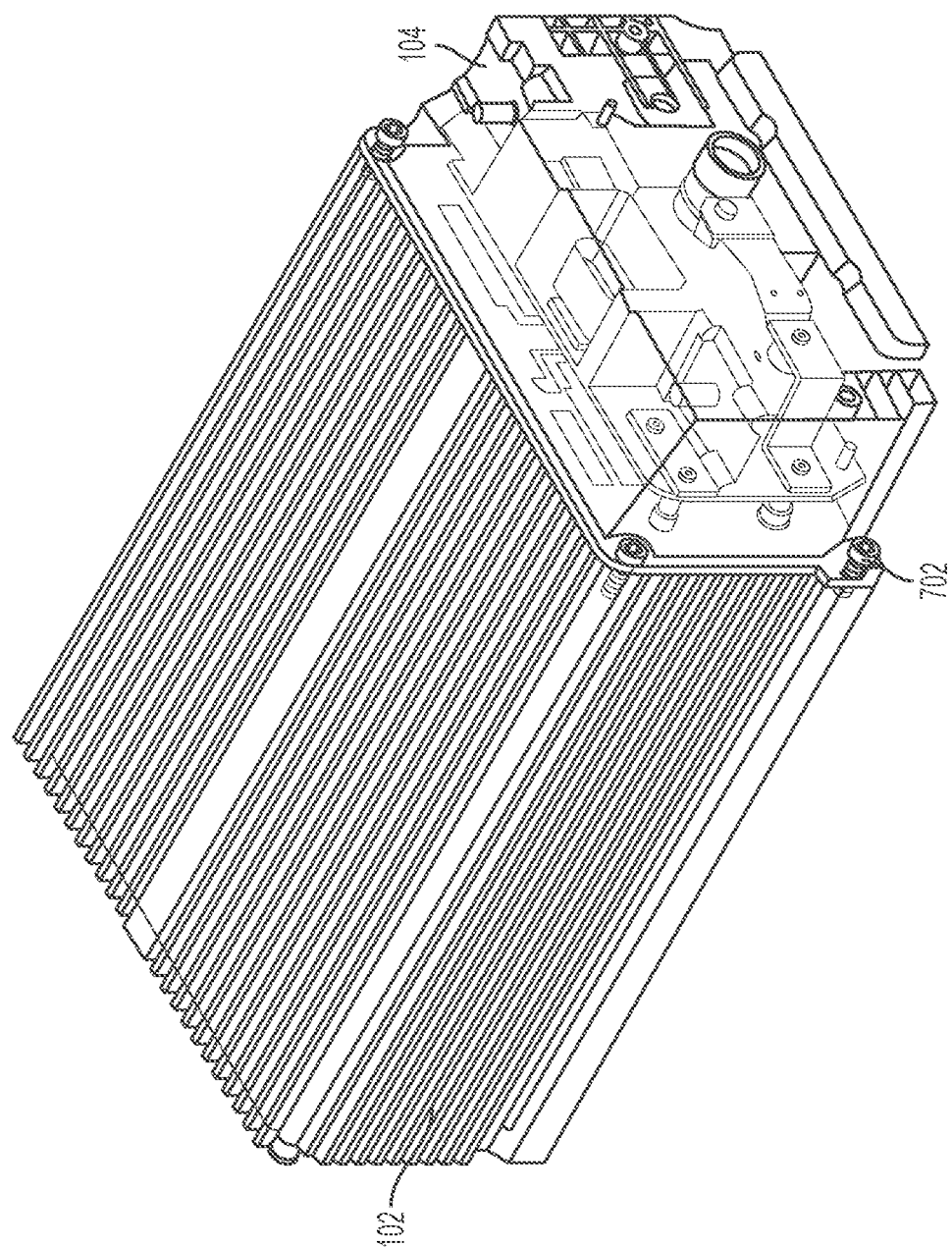
FIG. 7 shows a battery module embodiment with a transparent housing.

An illustration of one embodiment of a fully constructed battery module is provided in FIG. 7. In this figure, the front cover panel 104 is shown in a transparent manner to aid in the visualization of certain components housed by the cover panel 104. The front cover panel 104 may be secured to the module's extrusion 104 by way of one or more screws 702 positioned along the external perimeter of the front face of the module's extrusion.

Figure 8:
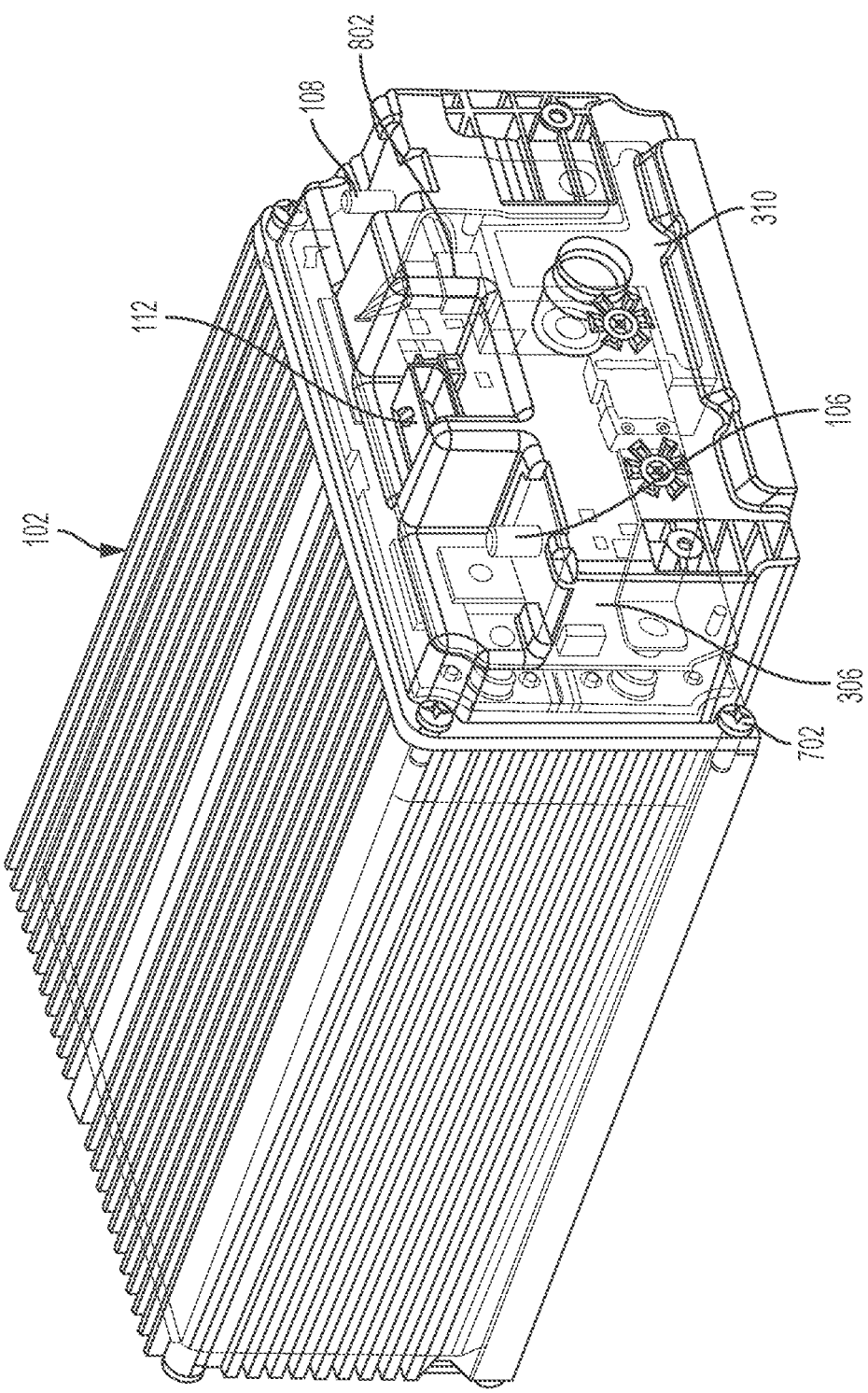
FIG. 8 shows an isometric view of a second example battery embodiment with a transparent housing.

With respect to FIG. 8, a second embodiment of the battery module according to the present disclosure is provided. In at least one embodiment, the battery module may comprise a stack of lithium-ion cells further comprising a plurality of individual cells within the module's extrusion 102, an electrical connection member 112, and one or more cell terminals 106,108. Additionally, the module may comprise an electronics board 306, a fuse 308, a relay assembly 310, and a relay connection 802. In at least one embodiment, the relay 310 may comprise a 48V relay, although other voltages are contemplated herein. While lithium-ion cells are disclosed, other cell chemistries may be used, if desired, such as nickel metal hydride.

The provided cell stack 302 may be positioned within an interior of the cell's extrusion 102 and may be fully surrounded and encapsulated by a silicone encapsulant material. Further, each cell within a cell stack may be in direct face-sharing contact with one another in at least one example embodiment. In this way, the additional thickness resultant from the inclusion of heat sink materials which may typically be disposed between each cell may be reduced. In doing so however, there may be an increased demand for heat dissipation from within the cell. Therefore, the encapsulant material disclosed below may provide thermal transfer capabilities to the cell even without the inclusion of a heat sink layer between each cell.

Figure 9:
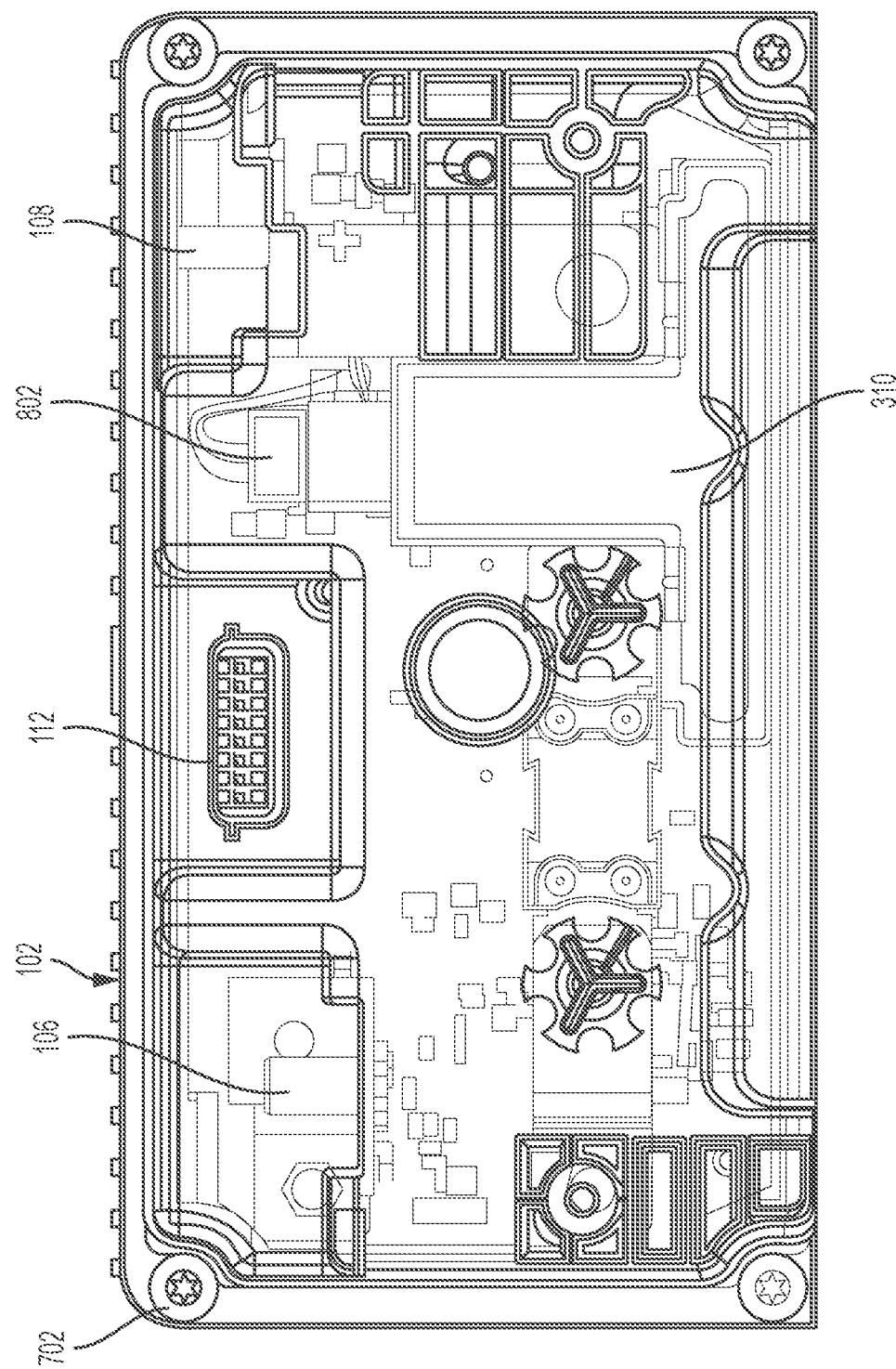
FIG. 9 shows a front profile view of a second example battery module.

The illustration provided in FIG. 9 shows a front view of a second embodiment of a battery module according to the present disclosure. In at least one embodiment, the battery module may comprise a stack of lithium-ion cells further comprising a plurality of individual cells within the module's extrusion 102, an electrical connection member 112, and one or more cell terminals 106,108. Additionally, the module may comprise an electronics board 306, a fuse 308, a relay assembly 310, and a relay connection 802. In at least one embodiment, the relay 310 may comprise a 48V relay, although other voltages are contemplated herein. While lithium-ion cells are disclosed, other cell chemistries may be used, if desired, such as nickel metal hydride.

The provided cell stack 302 may be positioned within an interior of the cell's extrusion 102 and may be fully surrounded and encapsulated by a silicone encapsulant material. Further, each cell within a cell stack may be in direct face-sharing contact with one another in at least one example embodiment. In this way, the additional thickness resultant from the inclusion of heat sink materials which may typically be disposed between each cell may be reduced. In doing so however, there may be an increased demand for heat dissipation from within the cell. Therefore, the encapsulant material disclosed below may provide thermal transfer capabilities to the cell even without the inclusion of a heat sink layer between each cell.

Figure 10:
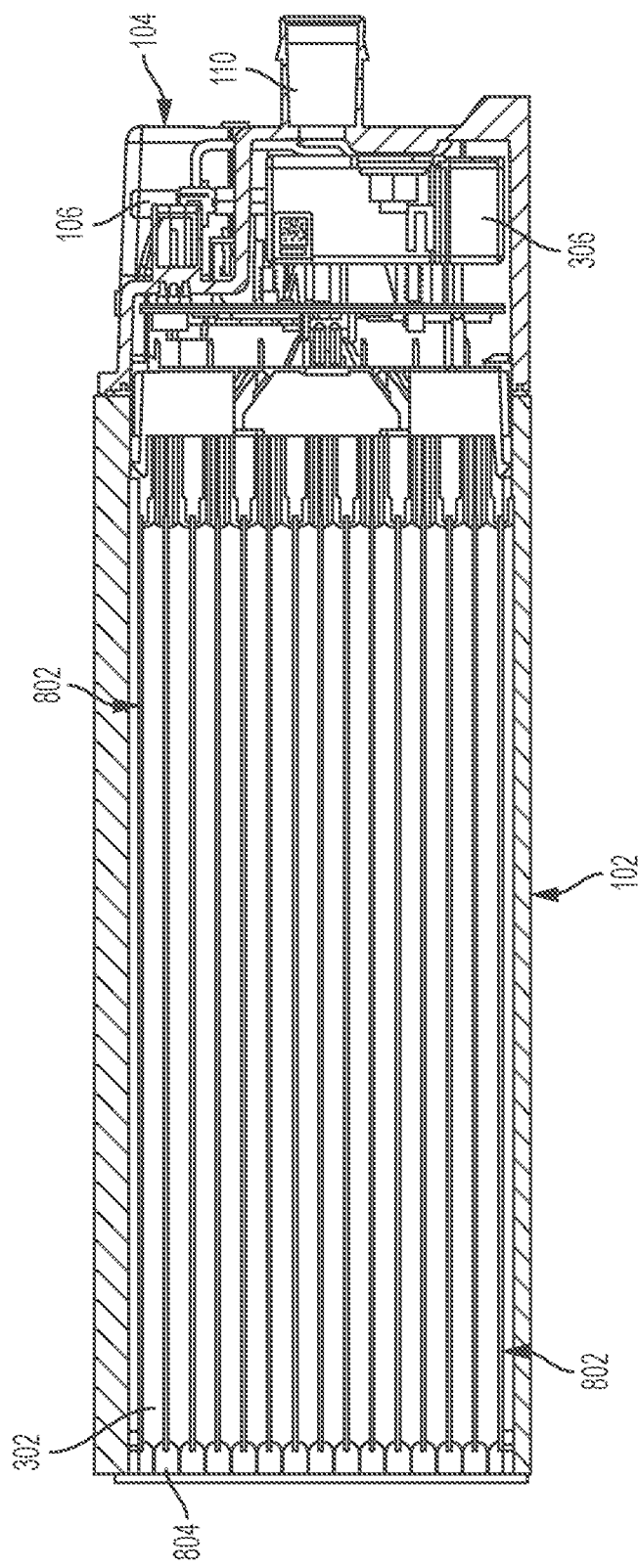
FIG. 10 shows a side profile view of a second example battery module.

In FIG. 10, a partial cutaway side profile view of a second example battery module embodiment is provided. In at least one embodiment, the battery module may comprise a stack of lithium-ion cells further comprising a plurality of individual cells within the module's extrusion 102, an electrical connection member 112, and one or more cell terminals 106,108. Additionally, the module may comprise an electronics board 306, a fuse 308, a relay assembly 310, and a relay connection 802. In at least one embodiment, the relay 310 may comprise a 48V relay, although other voltages are contemplated herein. While lithium-ion cells are disclosed, other cell chemistries may be used, if desired, such as nickel metal hydride.

The provided cell stack 302 may be positioned within an interior of the cell's extrusion 102 and may be fully surrounded and encapsulated by a silicone encapsulant material. Further, each cell within a cell stack may be in direct face-sharing contact with one another in at least one example embodiment. In this way, the additional thickness resultant from the inclusion of heat sink materials which may typically be disposed between each cell may be reduced. In doing so however, there may be an increased demand for heat dissipation from within the cell. Therefore, the encapsulant material disclosed below may provide thermal transfer capabilities to the cell even without the inclusion of a heat sink layer between each cell.

Figure 11:
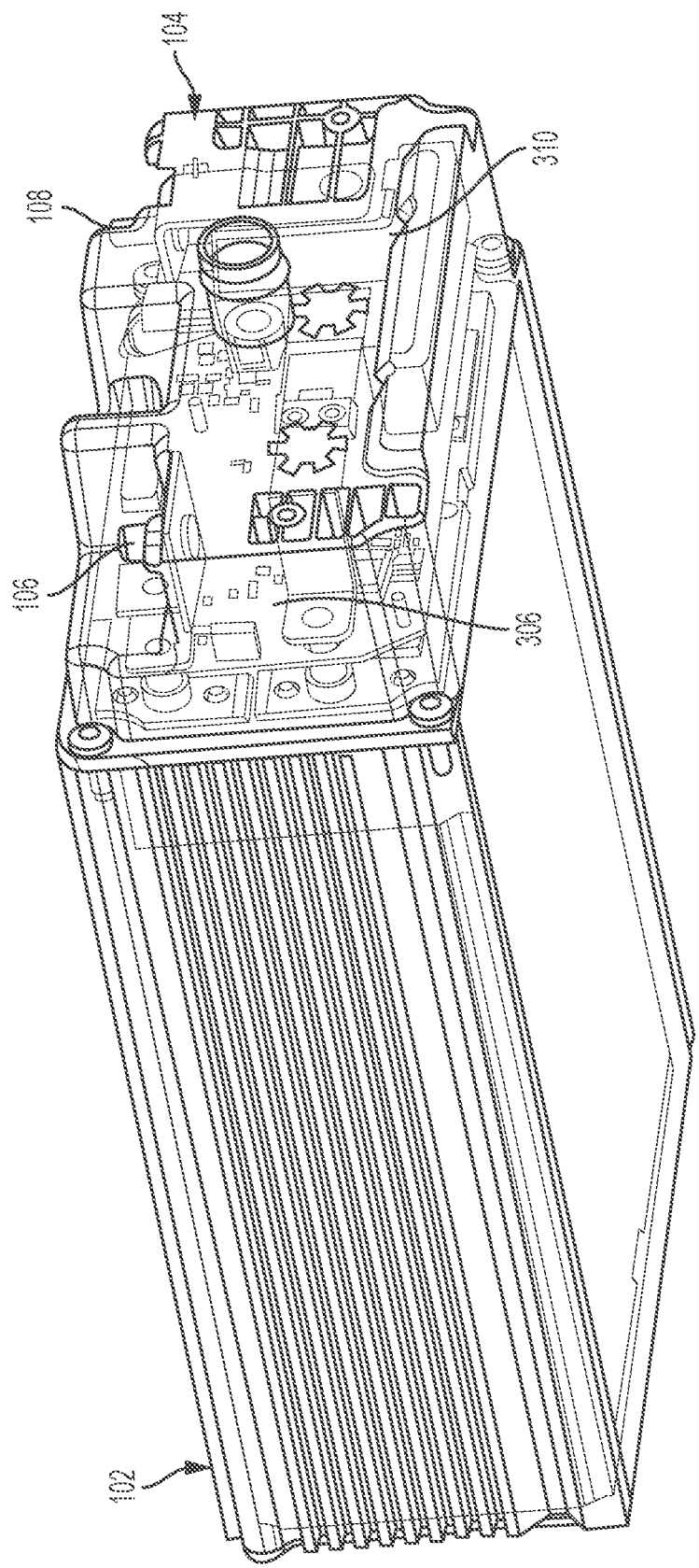
FIG. 11 shows an isometric upward view of a second example battery module.

FIG. 11 provides an additional view of a second example embodiment of a battery module according to the present disclosure. In at least one embodiment, the battery module may comprise a stack of lithium-ion cells further comprising a plurality of individual cells within the module's extrusion 102, an electrical connection member 112, and one or more cell terminals 106,108. Additionally, the module may comprise an electronics board 306, a fuse 308, a relay assembly 310, and a relay connection 802. In at least one embodiment, the relay 310 may comprise a 48V relay, although other voltages are contemplated herein. While lithium-ion cells are disclosed, other cell chemistries may be used, if desired, such as nickel metal hydride.

The provided cell stack 302 may be positioned within an interior of the cell's extrusion 102 and may be fully surrounded and encapsulated by a silicone encapsulant material. Further, each cell within a cell stack may be in direct face-sharing contact with one another in at least one example embodiment. In this way, the additional thickness resultant from the inclusion of heat sink materials which may typically be disposed between each cell may be reduced. In doing so however, there may be an increased demand for heat dissipation from within the cell. Therefore, the encapsulant material disclosed below may provide thermal transfer capabilities to the cell even without the inclusion of a heat sink layer between each cell.

Turning now to FIGS. 12A, 12B, 12C, and 12D. These figures provide illustrative examples detailing the construction of the disclosed battery module.

Figure 12A:
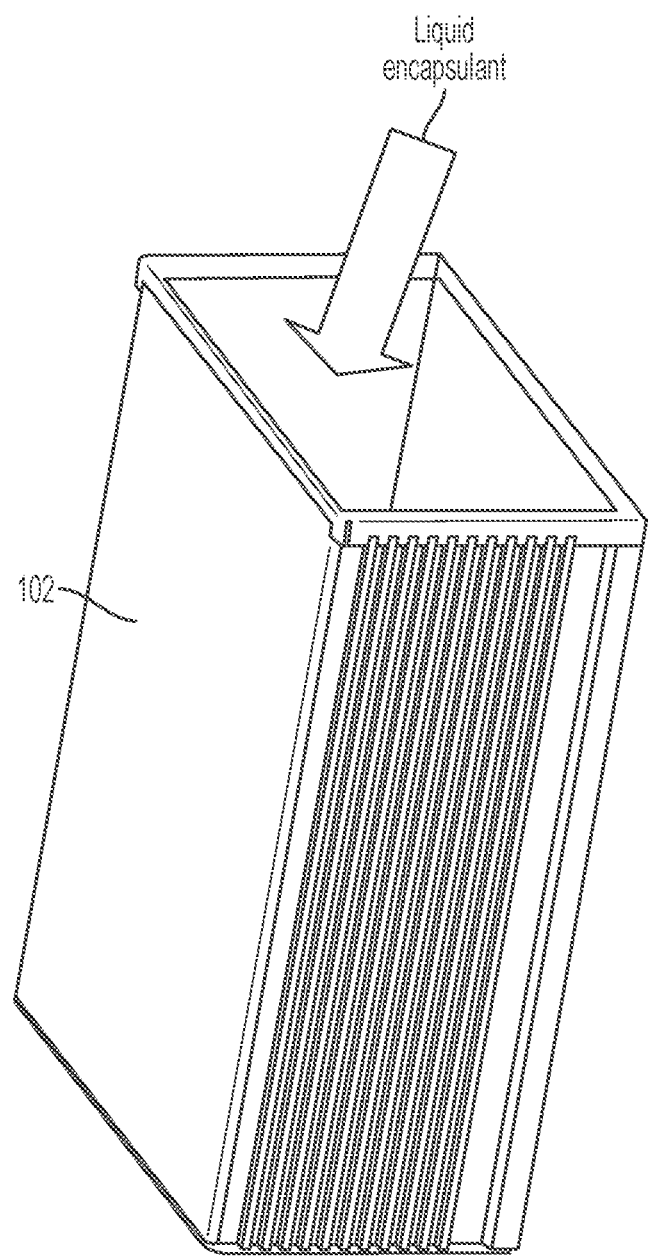
FIG. 12A illustrates the introduction of a liquid encapsulant into the housing.

To begin, FIG. 12A shows, the extrusion 102 component of the battery module into which an encapsulant material may be inserted. In one embodiment, the encapsulant material may comprise a liquid and may further comprise a silicone material. In one example embodiment, the silicone encapsulant may be the material LORD Thermoset SC-309 or another suitable such silicone material which exhibits excellent or improved thermal transfer characteristics. In other examples, other materials exhibiting improved thermal transfer characteristics may be used as an alternative encapsulant material.

The encapsulant material is selected specifically to exhibit low shrinkage and stress upon other components disposed within the module as the material cures, maintaining a low viscosity for ease of component encapsulation compared to other highly thermally conductive materials, providing excellent thermal shock resistance, and exhibiting an excellent flame retardancy.

It will be appreciated that other thermally conductive silicone encapsulant materials may be selected depending on various applications of the battery module disclosed herein.

The preparation of such a thermally conductive silicone encapsulant material may comprise the steps of mixing and applying. For example, when using LORD Thermoset SC-309 as an encapsulant material, each component of the material must be mixed thoroughly. Specifically, SC-309 Resin which is a gray liquid having a viscosity at 25° C. of 3500 cps and exhibits a specific gravity of 1.66 must be mixed with the SC-309 Hardener which is a white liquid having a viscosity at 25° C. of 3500 cps and exhibits a specific gravity of 1.66 in a 1:1 ratio by weight or volume. When combined, the Thermoset SC-309 encapsulant material takes the form of a light gray liquid having a viscosity at 25° C. of 3600 cps, and a specific gravity of 1.66. In some examples, automatic metered mixing equipment may be used, although other methods of mixing are contemplated herein.

In the preparation of the silicone encapsulant material, it is important to note that great care must be taken to minimize the amount of air and therefore, air bubbles that are introduced into the encapsulant system either during mixing or when catalyzing the mixture. The electrical properties of the silicone encapsulant are more readily apparent and best when air bubbles trapped within the encapsulant are reduced. Therefore, in extremely high voltage or other such critical applications, vacuum application may be appropriate.

Once the mixture is thoroughly combined, the encapsulant mixture may then be supplied to an interior area of the battery module's extrusion and the stacked electrode components may then be inserted into the extrusion such that the encapsulant fully surrounds the cells. Once the cells have been inserted into the extrusion, the mixture may then proceed to the curing step. In one example embodiment, the encapsulant was allowed to cure for 24 hours at room temperature. In another embodiment, the mixture was allowed to cure at 100° C. for 15 minutes, and in still another embodiment, the mixture was cured at 120° C. for 10 minutes.

Once cured, the silicone encapsulant may exhibit a volume resistivity at 25° C. of $4.3*10^{13}$ Ω/cm, a thermal conductivity of 1.0 W/mk, a coefficient of linear thermal expansion of 190 ppm/° C., a tensile strength of 0.34 MPa, a moisture absorption of less than 0.5%, a dielectric strength of 600 V/mil, a dielectric constant at 25° C. of 4.0, and a dissipation factor at 25° C. of 0.004%. Through the use of such a material as a silicone encapsulant, it may no longer be expedient to provide traditional heat sink components.

Figure 12B:
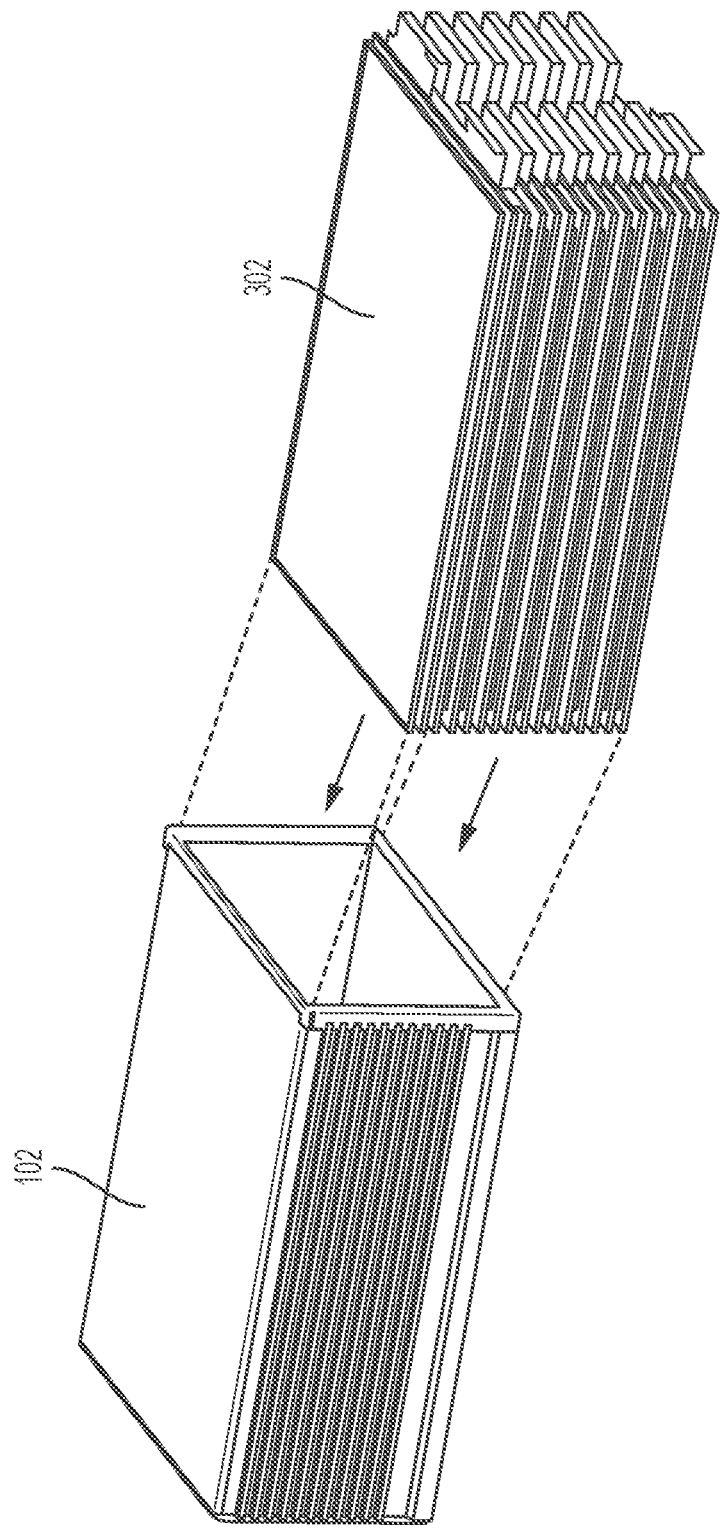
FIG. 12B illustrates the disposal of a plurality of prismatic cells into the module housing.

Once filled with the encapsulant material, as illustrated in FIG. 12A, the cell stack(s) 302 may be inserted into the module's extrusion 102 such that the encapsulant material disposed within may fully surround and effectively encapsulate the cells as illustrated in FIG. 12B. In this way, an encapsulant exhibiting excellent thermal transfer characteristics may be provided as an alternative to traditional heat sink components which may not account for the thermal gap within the module.

Figure 12D:
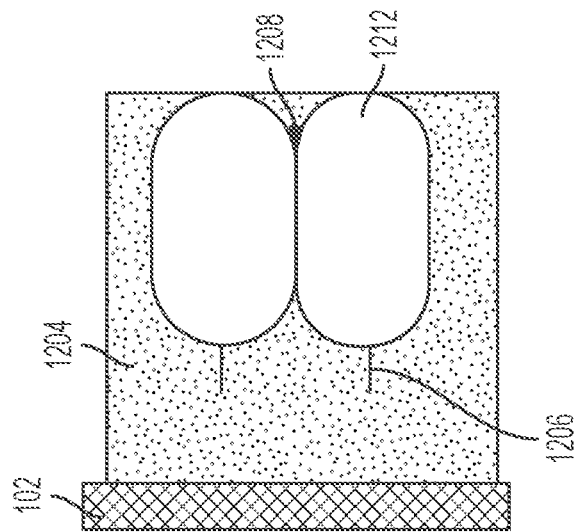
FIG. 12D provides an enlarged view of a cell stack surrounded by an encapsulant.
Figure 12C:
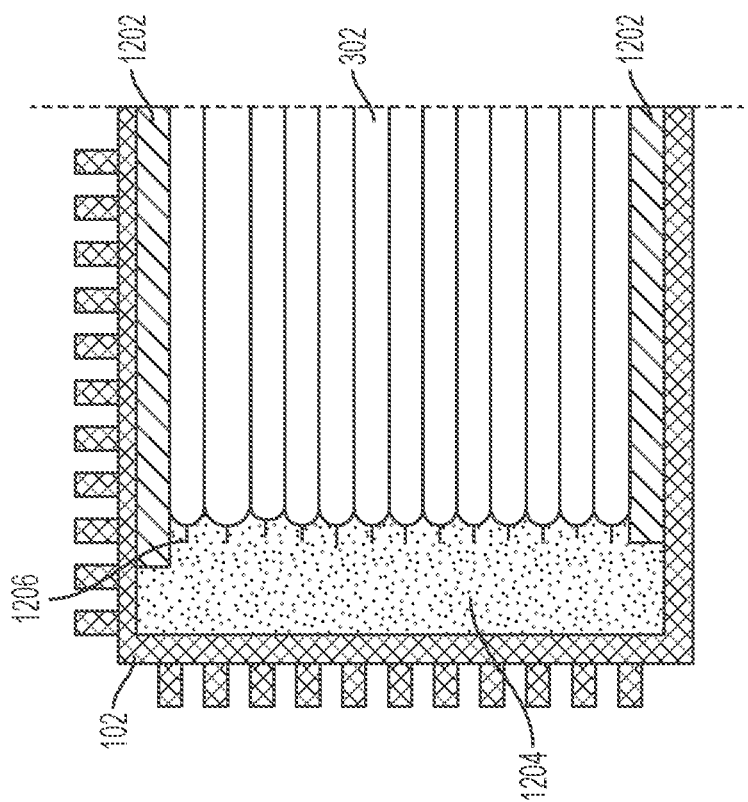
FIG. 12C shows cutaway view of an interior section of a battery module embodiment including an encapsulant.

FIG. 12C provides a cutaway view of an example battery module embodiment and illustrates the interior relationship between the cells 302, the encapsulant 1204, and the extrusion 102. In this view, it may be visually apparent that the encapsulant material 1204 fully surrounds the gaps or recesses within the module's interior. In this way, thermal conductivity may be established throughout the entirety of the battery module. Further, a thermal gap pad or compliance pad 1202 may be provided in some embodiments to isolate the cells from the module's extrusion 102 as well as providing another route for heat dissipation from within the cell. The cells 302 may further include at least one current collection tab 1206 which may transfer the provided current out of the cell/module and into the device or apparatus requiring an electrical load.

FIG. 12D provides an enlarged view illustrating the lack of separate heat sink tabs or plates disposed between each cell 1212. It will be appreciated however, that at the interface 1208 may be formed by the intimate face-sharing contact of each individual cell 1212 comprising the cell stack(s). Additionally, as may be visually evident in FIG. 12D, the encapsulant material may fully surround the cells and/or cell stack. Specifically, the encapsulant material may be disposed along each of four sides of the cell components. In this way, the thermal conductivity of the encapsulant material may be fully utilized throughout the battery module.

Figure 13:
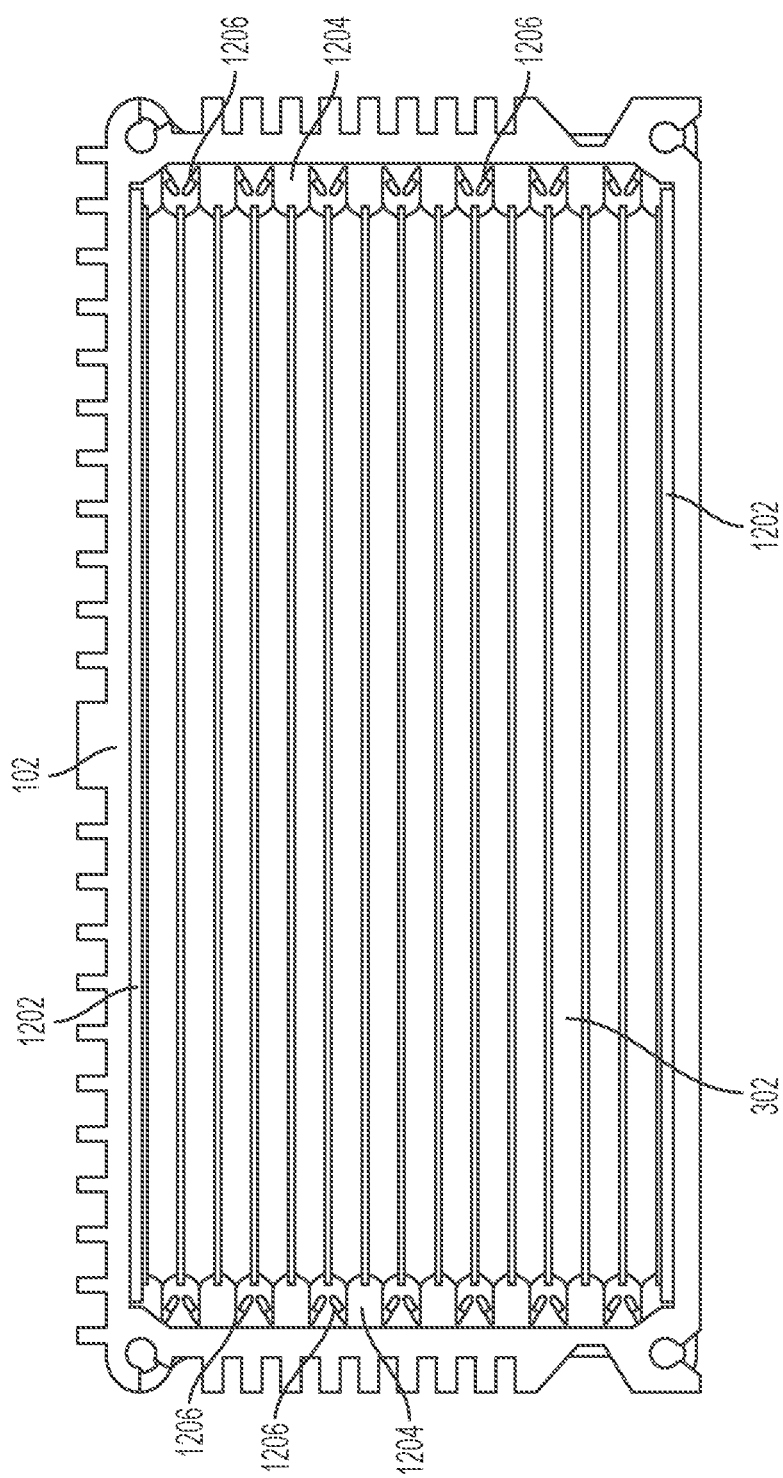
FIG. 13 illustrates a front cutaway view of an example battery module embodiment.

A further illustration of one embodiment of a battery module according to the present disclosure is provided in FIG. 13. Here, an illustrated view of a battery module according to the present disclosure is provided. In this view, the stack of cells 302 is disposed within a battery module's extrusion 102 member. Additionally, the cells 302 may be further isolated from the extrusion 102 via the inclusion of one or more thermal gap pads 1202 which may provide additional isolation of the cells from the module's exterior. As noted above, the encapsulant material 1204 may be disposed within the module's extrusion 102 such that the entirety of the cell stack is fully surrounded by the encapsulant material. In some examples, however the encapsulant material may be disposed solely along each of the shorter two sides of the battery cells. In this way, a flexible configuration of the battery module may be provided.

In FIG. 13, the current collection tabs 1206 of each individual cell comprising the cell stack are visible. In providing extended current collection tabs 1206 on each cell comprising the cell stack, it may be possible to fully transfer the electrical charge held within the battery module to an exterior load. It will be further appreciated that the silicone encapsulant material used herein may substantially surround the current collector tabs in at least one embodiment. In another embodiment, the current collector tabs may be at least partially separated from the encapsulant material to provide additional connection possibilities.

Again, it will be further noted that as used herein the cell stacks comprised of electrode stacks do not include a heat sink disposed therebetween. Specifically in at least one embodiment disclosed herein, the each cell may be in direct face-sharing contact with one another such that the space between the components is reduced.

Figure 14A:
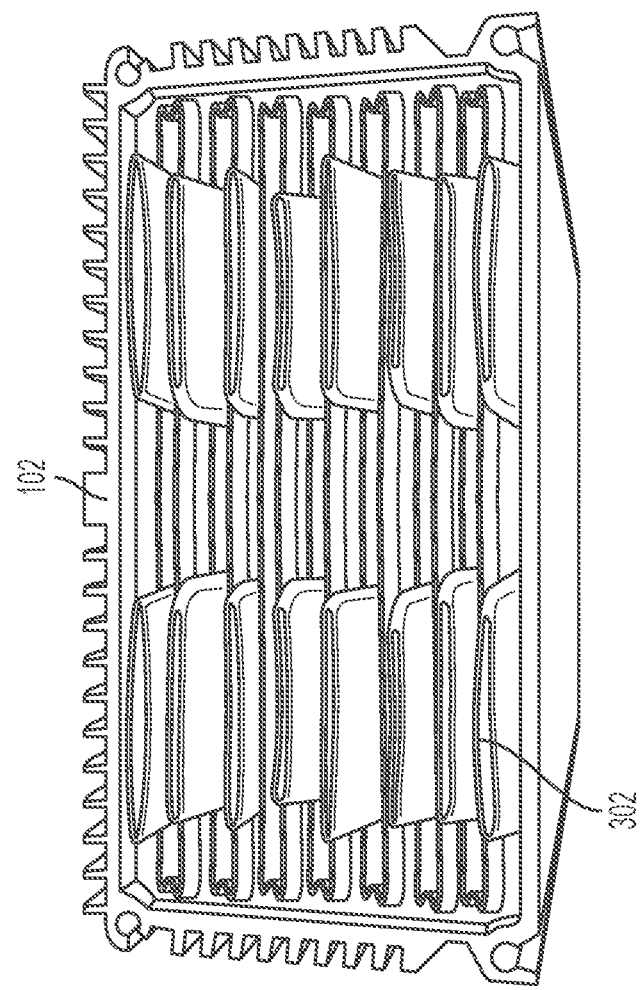
FIG. 14A is a photograph showing a stack of cells disposed in a housing.
Figure 14B:
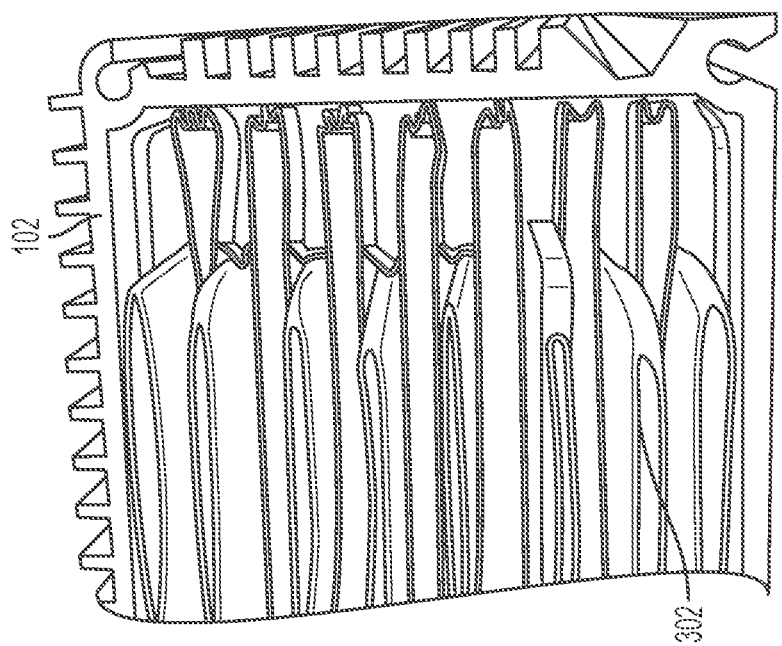
FIG. 14B is a photograph showing a cured encapsulant material surrounding a stack of cells disposed within a housing.

Finally, FIGS. 14A and 14B provide additional views into a battery module embodiment according to the present disclosure. The stacked cells 302 are disposed within an interior area of the extrusion 102 as noted above and the encapsulant material is cured therein. Although the encapsulant material is not readily visible in FIGS. 14A and 14B, there are no heat sink components disposed between each cell.

An example technical effect of using a silicone encapsulant material is that traditional methods of heat dissipation from within a battery module such as heat sinks may be eliminated or reduced according to the present disclosure.

As one example, a battery module is disclosed comprising a plurality of electrochemical cells wherein the electrochemical cells may be arranged in a prismatic stack, an extrusion housing the plurality of electrochemical cells configured to direct excess heat away from the module, a silicone encapsulant material disposed within the extrusion housing and configured to receive excess heat from the module, wherein the silicone encapsulant substantially surrounds the prismatic stack of electrochemical cells and a front cover panel that may be removably coupled to the extrusion. Another embodiment may optionally include the aforementioned example, and may further comprise a plurality of electrochemical cells that do not comprise a heat sink component disposed therebetween. A third exemplary embodiment may optionally include any of the first through second examples and may further comprise a battery module wherein the silicone encapsulant material has a dielectric constant within the range of 3.0 to 5.0. A fourth example may optionally include any of the first through third examples and may further comprise a battery module wherein the silicone encapsulant material comprises LORD Thermoset SC-309. Another example of this battery module may optionally include any of the first through fourth examples and may further comprise an extrusion comprising a plurality of heat dissipating protrusions along a top surface and each side surface of the extrusion.

As another example, a battery module comprising a solid external enclosure, one or more prismatic electrochemical cells disposed within the solid external enclosure, an electronics board communicatively coupled to the one or more prismatic electrochemical cells, a silicone encapsulant material disposed within an interior of the solid external enclosure configured to receive and dissipate heat from within the battery module, and a front panel cover releasably coupled to the solid external enclosure is provided. A second example of the aforementioned battery module may include the components of the first example, and may further comprise a module wherein the one or more prismatic electrochemical cells do not comprise a heat sink. A third exemplary embodiment may optionally include any of the first and second examples and may further comprise a module wherein the silicone encapsulant material has a dielectric constant in the range of 3.0 to 5.0. A fourth example may optionally include any of the first through third examples and may further comprise a module wherein the silicone encapsulant material comprises LORD Thermoset SC-309. Another exemplary embodiment may optionally include any of the first through fourth examples and may further comprise a solid external enclosure comprising a plurality of heat dissipating protrusions along a top surface and each side surface of the solid external enclosure.

Additionally, a battery pack comprising one or more battery modules comprising a plurality of electrochemical cells wherein the electrochemical cells are arranged in a prismatic stack, an extrusion housing the plurality of electrochemical cells configured to direct excess heat away from the module, a silicone encapsulant material disposed within the extrusion housing and configured to receive excess heat from the module, wherein the silicone encapsulant substantially surrounds the prismatic stack of electrochemical cells, and a front cover panel removably coupled to the extrusion, a housing configured to fully surround the one or more battery modules, and one or more externally disposed electrical connection ports configured to supply a charge from within the battery pack to a load. A second example of the battery pack may include the first example and may further comprise a pack wherein the plurality of electrochemical cells to not comprise a heat sink component disposed therebetween. A third example may optionally include any of the first through second examples and may further comprise a battery pack wherein the silicone encapsulant material has a dielectric constant in the range of 3.0 to 5.0. A fourth example may optionally include any of the first through third examples and may further comprise a pack wherein the silicone encapsulant material comprises LORD SC-309. Another exemplary embodiment may optionally include any of the first through fourth examples and may further comprise a pack wherein the extrusion comprises a plurality of heat dissipating protrusions along a top surface and each side surface of the extrusion.

Various modifications of the present disclosure, in addition to those shown and described herein, will be apparent to those skilled in the art of the above description. Such modifications are also intended to fall within the scope of the appended claims.

It is appreciated that all reagents are obtainable by sources known in the art unless otherwise specified.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular embodiments of the invention, but is not meant to be a limitation upon the practice thereof.

The foregoing discussion should be understood as illustrative and should not be considered limiting in any sense. While the inventions have been particularly shown and described with references to preferred embodiments thereof, it will be understood by those skilled in the art that various changes in form and details may be made therein without departing from the spirit and scope of the inventions as defined by the claims.

The figures show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The corresponding structures, materials, acts and equivalents of all means or steps plus function elements in the claims below are intended to include any structure, material or acts for performing the functions in combination with other claimed elements as specifically claimed.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A battery module, comprising:
a solid metal aluminum external enclosure;
one or more prismatic electrochemical cells disposed within the solid metal aluminum external enclosure;
an electronics board communicatively coupled to the one or more prismatic electrochemical cells;
a silicone encapsulant material disposed within an interior of the solid metal aluminum external enclosure and fully surrounding and encapsulating the one or more prismatic electrochemical cells, the silicone encapsulant material configured to receive and dissipate heat from within the battery module, wherein the silicone encapsulant material comprises a cured mixture of a liquid and a silicone material, and wherein the silicone encapsulant material fully surrounds gaps or recesses within the interior of the solid metal aluminum external enclosure; and
a front cover panel releasably coupled to the solid metal aluminum external enclosure.

2. The battery module of claim 1, wherein the one or more prismatic electrochemical cells do not comprise a heat sink component.

3. The battery module of claim 1, wherein the silicone encapsulant material has a dielectric constant in the range of 3.0 to 5.0.

4. The battery module of claim 1, wherein the solid metal aluminum external enclosure comprises a plurality of heat dissipating protrusions along a top surface and each side surface of the solid metal aluminum external enclosure.

5. A battery pack, comprising:
one or more battery modules comprising a plurality of electrochemical cells, wherein the plurality of electrochemical cells are arranged in a prismatic stack, an extrusion housing the plurality of electrochemical cells configured to direct excess heat away from the one or more battery modules, a silicone encapsulant material comprising a cured liquid encapsulant disposed within the extrusion and configured to receive excess heat from the one or more battery modules, wherein the silicone encapsulant material fully surrounds the prismatic stack of electrochemical cells, and a front cover panel removably coupled to the extrusion;
the extrusion, wherein the extrusion is configured to fully surround the one or more battery modules; and
one or more externally disposed electrical connection ports configured to supply a charge from within the battery pack to a load.

6. The battery pack of claim 5, wherein the plurality of electrochemical cells do not comprise a heat sink component disposed therebetween.

7. The battery pack of claim 6, wherein the silicone encapsulant material has a dielectric constant in the range of 3.0 to 5.0.

8. The battery pack of claim 7, wherein the extrusion comprises a plurality of heat dissipating protrusions along a top surface and each side surface of the extrusion.

9. The battery pack of claim 6, wherein each cell of the plurality of electrochemical cells is in direct face-sharing contact with at least one other cell of the plurality of electrochemical cells.

10. The battery pack of claim 5, wherein the silicone encapsulant material fully surrounding the prismatic stack of electrochemical cells comprises the silicone encapsulant material being disposed along each of four sides of cell components of the prismatic stack of electrochemical cells.

* * * * *